June 17, 1941.   G. F. CASTLE   2,245,852
BRAKE CONTROLLED ACCELERATOR
Original Filed Oct. 18, 1937   2 Sheets-Sheet 1
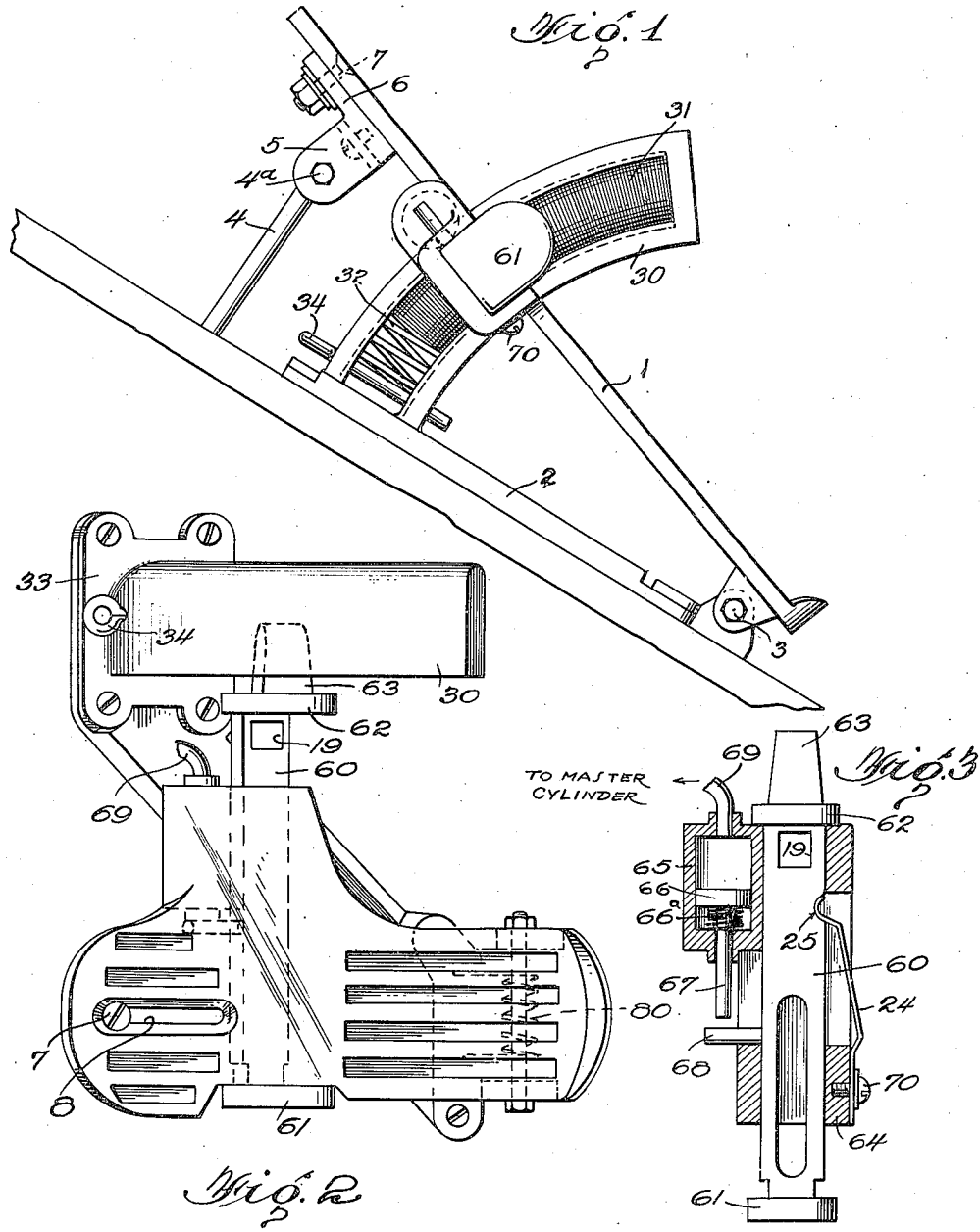
Inventor
George F. Castle
By Oberlin, Limbach & Day
Attorneys

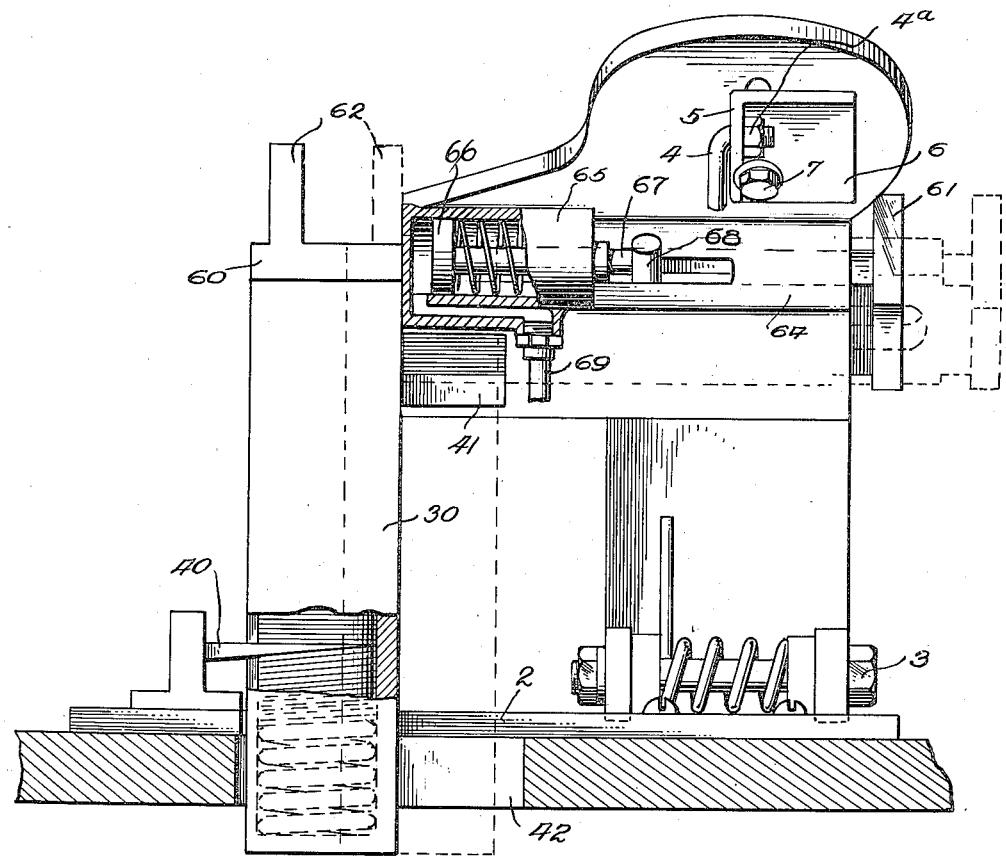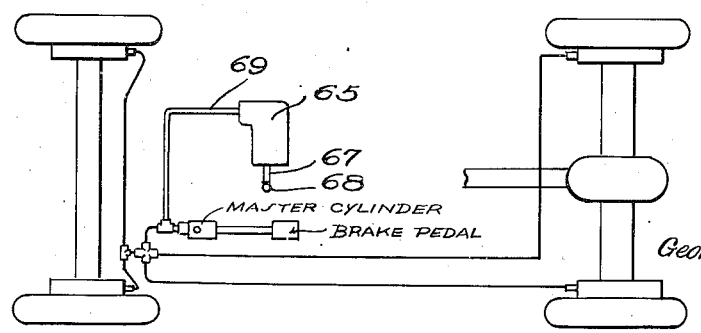

Patented June 17, 1941

2,245,852

UNITED STATES PATENT OFFICE 2,245,852

BRAKE CONTROLLED ACCELERATOR

George F. Castle, Baltimore, Md., assignor of one-half to Henry A. Buhman, Baltimore, Md.

Original application October 18, 1937, Serial No. 169,717. Divided and this application July 17, 1939, Serial No. 284,971

13 Claims. (Cl. 192—3)

The operation of modern automobiles, trucks and busses has materially increased the average trip length of such vehicles due to improvements in riding comforts as well as improvements in mechanical devices, such as engines, shock absorbers, and other means rendering it quite easy to take relatively long cross country trips. This in turn has resulted in one outstanding discomfort in driving, namely, the strain or leg cramp produced by constantly holding one foot upon the accelerator. Hand throttles which sought to eliminate this strain have proven of no great value and are used at present as emergency equipment only. Practically all self propelled vehicles are equipped with foot accelerators which require constant application of the driver's foot. Obviously greater driving comfort can be obtained if the accelerator can be retained at any desired speed by an easy manipulation of the foot, thus permitting the driver the freedom from continued pedal pressure.

The invention described herein is not limited to vehicles as it can be applied to motor boats, aeroplanes, military equipment such as tanks and trucks and any other apparatus where there is a speed control rod, arm or lever. In fact tractors present an ideal field of usage as they travel over rough terrain where it is highly desirable to maintain an even flow of fuel, which is difficult to do with conventional apparatus as the driver's foot moves with each bouncing movement of the tractor.

The object of the present invention is accordingly to provide a means adaptable to a conventional foot accelerator such means being engageable when desired to relieve leg fatigue and to secure an even driving speed.

It is also an object of the invention to provide a means for supplying gasoline or any other fuel in a constant regulated amount.

It is a further object of the invention to eliminate to a great extent the wear which occurs from back lash.

It is a still further object of the invention to reduce the fuel consumption of a self-propelled vehicle through the medium of uninterrupted acceleration.

Another object of the invention is to provide a safe guard for breaking in a new motor.

A still further object of the invention is to provide means for preventing theft of a motor vehicle.

A more detailed object of the invention is to provide an accelerator with latching means to retain said accelerator in any desired position and where the apparatus is provided with a fluid pressure brake system such latching means can be released upon application of the brake lever. A still more detailed object of the invention is to provide a piston and cylinder on an accelerator pedal connected to the master cylinder of a fluid pressure brake system and operable thereby to release an accelerator latch member.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but several of various mechanical forms in which the principle of the invention may be used.

In the accompanying drawings:

Fig. 1 is a side elevation of one form of the device.

Fig. 2 is a plan view of Fig. 1 taken from above.

Fig. 3 is a partial horizontal section showing the latch member released.

Fig. 4 is a front elevation of a modification wherein the parts are reversed and shown in latching position.

Fig. 5 is a diagrammatic illustration of the brake and accelerator control.

The form of the invention shown in Figs. 1 and 2 illustrates my accelerator pedal connected to an accelerator rod but it is, of course, to be understood that the invention is applicable to the inverted spoon type accelerator or any fuel feed control. Where the vehicle is equipped with the last mentioned type of accelerator no positive connection is necessary as the foot pedal can be so mounted as to slide upon the spoon. This is such an obvious expedient that the same has not been illustrated, nor have the various forms of fuel feed controls been shown, as a combination of the present device with all such controls is contemplated.

In Fig. 1 a pivotally mounted accelerator pedal 1 is shown, such pedal being connected to a base 2 by some such means as a bolt 3. This pedal is obviously adapted for arcuate movement and connects with an accelerator rod 4 by means of the lug 5. The lug 5 has a flat portion 6 which abuts the lower surface of the pedal 1 and is connected to such pedal by means of the screw 7. The screw 7 is seated in a recess 8, thus providing for longitudinal adjustment of the attaching bracket. Obviously, the bracket 6 may be rotated so that the depending lug 5 can assume any one of a large number of positions. The lug 5 has an aperture adapted to receive the bent end of an accelerator rod 4 and such end may be screw threaded to receive nut 4a.

The connection comprising the bracket 6 for attaching the accelerator rod to the bottom of the pedal is obviously adaptable to all style rods inasmuch as it is adjustable up and down and since the bracket may be transposed to practically any position. Obviously then, my device can be sold as a unit and installed in all types of self propelled apparatus that are provided with an accelerating means.

The mechanical means for retaining the accelerator pedal 1 in any desired position comprises a latch member that is transversely slidable with respect to such pedal, such latch member having a pointed tooth which engages a series of loose disks held in a slotted retaining tube.

In the particular form shown in Figs. 1 and 2, the latch member consists of a bar 60 having upstanding push lugs 61 and 62 so that the driver by a small twist of his foot may engage the latch. The bar 60 is slidably held immediately beneath the pedal 1 in a recess formed by the small yoke 64. This yoke may or may not be integral with the pedal. The bar 60 is frictionally engaged by the spring member 24 which exerts sufficient pressure to hold the latch out of engagement when the curved end thereof is seated in the recess 25.

This spring member 24 also prevents rattling of the bar 60 after long usage and at the same time it prevents undue transverse movement of the bar 60.

A pointed tooth 63 extends outwardly from the push lug 62 so that upon movement of the latch member such tooth enters between any two disks in the retaining tube or standard 30. The retaining tube 30 is provided with a hollow interior in order to receive a series of preferably thin disks 31, these disks being resiliently held together by means of a coil spring 32 located at the base of the retaining tube 30. The retaining tube 30 has a base 33 which is attached to the base member 2 so that all of the parts of the device are held in assembled relationship as a single unit. A cotter pin 34 or equivalent, such as a bolt, may be used to hold the spring 32 removed and slightly above the base 33 in order to render dismantling of the coil spring 32 and disks 31 quite simple, and the disks 31 are preferably made with thin bevelled outer edges in order that the tooth 63 may be readily engaged by such disks. This shape of the disks in conjunction with the coil spring permits easy entrance of the tooth 63, but at the same time once the tooth is engaged the resilient pressure is sufficient to hold the same in latched position. Furthermore, the thin bevelled edge on the disks imparts extremely fine adjustability.

That part of the bar 60 at the upper side (as viewed in Fig. 3) performs three functions. The pointed tooth provides an easy means of engagement, the upstanding portion 62 provides a means of pushing the bar into engagement and the part beneath the push lug 62 provides a stop limiting the return movement.

The yoke 64 which preferably lies immediately beneath the accelerator pedal is provided with a fluid pressure cylinder 65 having a piston 66 therein that has a stem portion 67 that directly abuts a portion 68 of the latch member 60. The spring 66a surrounds such stem and it normally forces the piston away from portion 68. The flexible conduit 69 extends from the master cylinder shown in Fig. 5 and upon application of the brake of the vehicle, or other apparatus, fluid pressure causes the piston 66 to move transversely of the pedal and assume the position shown in Fig. 3, thus withdrawing the pointed tooth 63 from between two disks and permitting the pedal to move upwardly and cut off the fuel supply. It is, of course, to be understood that the fluid pressure cylinder is to be used to disengage the accelerator and that engagement always takes place because of a manual operation.

In this embodiment it is merely necessary to touch the brake pedal without any touching of the accelerator pedal except when the same is engaged. This means that after a certain speed is set the operator has one foot free thus rendering operation more comfortable and free from leg cramp. Also, in an emergency the driver has only one step to perform, namely, application of the brake, instead of first removing his foot from the accelerator pedal, and then applying the brake. Regardless of any brake system or latching means this accelerator pedal is first of all operated independently and in the conventional way. The latching feature and brake controlled automatic release is additional, to be used when and if desired at the operator's free will.

The latch members and more particularly the bars thereof may be provided with openings 19 (see Figs. 2 and 3) of sufficient size to permit the reception of a padlock. Thus it will be seen that the accelerator pedal can be moved to closed or fuel shut off position, the latch member engaged and then locked in place. This will effectively prevent theft of the self propelled apparatus as all motors require some degree of acceleration especially when starting or shifting gears.

It will now be seen that I have provided an accelerator which may be used in exactly the same manner as a conventional foot accelerator or may be changed to an automatic device at will. It will be noted that this accelerator can be engaged instantly whenever desired to relieve leg fatigue and at the same time to secure an even fuel supply. It will also be observed that in order to disengage my latch it is merely necessary to apply the brake which instantly releases the accelerator latch.

It is to be undertsood that a mere reversal of parts is within the purview of this application and that the accelerator pedal could have a retaining tube, such as the member 30, mounted thereon so that the same could be moved with respect to the pedal into engagement with a stationary finger 40, as shown in Fig. 4.

In Fig. 4 the stationary tube is movably mounted upon the latch bar 60 and moves into the recesses 41 and 42. Like parts have corresponding numbers and it is not necessary to again describe the various details. A stationary finger 40 is shown fixedly mounted so that the slotted tube 30 when moved to the left as shown in Fig. 4 causes the discs to engage the finger 40.

If desired, a spring 80 may be used to normally force the pedal 1 upwardly although most accelerators are usually provided with some spring means to force the same to closed position.

The word "fluid" is used throughout this description in its true sense and is intended for air, gas or liquid, as all of such mediums have been employed in braking systems in the past. In this connection it should be observed that the drawings are merely diagrammatic and that no attempt has been made to show the master cylinder or the various parts hereof.

The spring 32 described above has an additional important function in that it permits depression of the accelerator pedal 1 to a slight extent without the necessity of disengaging the latch bar 60. This is extremely important where a quick increase of speed is desired, such as occurs when passing another car and in the case of an emergency to avoid collision with another car. It is merely necessary for the driver to push the pedal 1 which will increase the speed of the motor some twenty or twenty-five miles per hour, depending upon the length of the spring 32 and the strength thereof.

From the foregoing description it will be seen that although I have provided a control for the accelerator which maintains a constant speed, nevertheless my construction will be safer to use than a conventional accelerator pedal lacking such control. This follows because the operator can apply his foot to the brake without having to remove the same from the accelerator pedal.

It will also be seen that the operator need not maintain his foot upon the accelerator pedal but instead can rest his foot near the brake pedal. Heretofore, accelerator controls, if used, were objectionable because disengagement consumed considerable time and prevented a rapid application of the brakes. It will be seen that accidents can be avoided with my device and that operating fatigue can be greatly lessened. It will be noted that regardless of the brake system providing a means for instant automatic release from latched position, this accelerator pedal can always be latched to an engaged position by a manual operation and unlatched to a disengaged and normal position by a manual operation at the operator's free will.

This application is a division of my co-pending application Serial No. 169,717, filed October 18, 1937, titled "Accelerator," now issued into Patent No. 2,166,128.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In an automobile the combination of a fluid pressure brake system with an accelerator pedal, said system being operable by means of a lever, said accelerator pedal having a latching member thereon, said member being manually movable to latching position and a fluid pressure means for releasing said member, there being connections present from said lever to said fluid pressure means whereby said latch member may be released upon movement of said lever.

2. In an automobile the combination of a fluid pressure brake system with an accelerator pedal, said system being operable by means of a foot lever, said accelerator pedal having a latching member thereon, said member being manually movable to latching position and a fluid pressure means for releasing said member, there being connections present from said foot lever to said fluid pressure means whereby said latch member may be released upon movement of said lever.

3. The combination of a brake lever, a master cylinder and an accelerator pedal, said accelerator pedal having mounted thereon a latching member and a cylinder and piston, a conduit leading from said master cylinder to such accelerator cylinder, whereby movement of said brake lever causes movement of said latching member when said latching member is in latching position.

4. The combination of an accelerator pedal, a latch member slidable with respect to said pedal, a cylinder mounted upon said pedal, a piston in said cylinder, said piston being adapted to engage a part of said latch member whereby movement of said piston in one direction causes movement of said latch member in the same direction.

5. The combination of an accelerator pedal, a latch member slidable with respect to said pedal, a cylinder mounted upon said pedal, a piston in said cylinder, said piston being adapted to engage a part of said latch member whereby movement of said piston in one direction causes movement of said latch member in the same direction, said piston being movable in an opposite direction without affecting the said latch member.

6. In a self-propelled vehicle the combination of a fluid pressure brake system and an accelerator pedal, said brake system being operable by a lever, said pedal having a cylinder and piston mounted thereon and means present to cause said piston to move when said brake lever is moved.

7. In a self-propelled vehicle, the combination of a fluid pressure brake system and an accelerator pedal, said brake system being operable by a lever, said pedal having a cylinder and piston mounted thereon and means present to cause said piston to move when said brake lever is moved, said means including a master cylinder and a conduit from said master cylinder to said cylinder mounted on said accelerator.

8. In apparatus of the character described, the combination of a fluid pressure brake system operated by a brake lever, an accelerator and latching means, including a series of discs and a pointed tooth to retain said accelerator in any desired position by inter-engagement of said tooth with said discs, there being means present to disengage said tooth and discs to release said latching means when said brake lever is moved.

9. In apparatus of the character described, the combination of a fluid pressure brake system operated by a brake lever, an accelerator and latching means, including a series of discs and a pointed tooth to retain said accelerator in any desired position by inter-engagement of said tooth with said discs, there being means present to disengage said tooth and discs to release said latching means when said brake lever is moved, said latching means being operable manually in one direction.

10. In apparatus of the character described, the combination of a fluid pressure brake system operated by a brake lever, an accelerator and latching means, including a series of discs and a pointed tooth to retain said accelerator in any desired position by inter-engagement of said tooth with said discs, there being means present to disengage said tooth and discs to release said latching means when said brake lever is moved, said latching means being operable manually in one direction, and automatically in an opposite direction to release same.

11. In apparatus of the character described, the combination of a fluid pressure brake system operated by a brake lever, an accelerator and latching means including a series of discs and a pointed tooth to retain said accelerator in any desired position by inter-engagement of said tooth with said discs, there being means present to disengage said tooth and discs to release said latching means when said brake lever is moved, said tooth being mounted in fixed position and said discs being mounted upon said accelerator for movement therewith.

12. In apparatus of the character described, the combination of a fluid pressure brake system operated by a brake lever, an accelerator and latching means including a series of discs and a pointed tooth to retain said accelerator in any desired position by inter-engagement of said tooth with said discs, there being means present to disengage said tooth and discs to release said latching means when said brake lever is moved, said tooth being mounted in fixed position and said discs being mounted upon said accelerator for movement therewith, said latching means being manually movable into latching position or release position.

13. In a device for latching an accelerator in a desired position, a series of discs and a pointed tooth, said tooth being slidably received between two of said discs to retain said accelerator in such desired position and said discs being relatively thin and having tapered peripheral edges.

GEORGE F. CASTLE.